(12) United States Patent
Uematsu et al.

(10) Patent No.: US 10,370,777 B2
(45) Date of Patent: Aug. 6, 2019

(54) NANOFIBER MANUFACTURING DEVICE AND NANOFIBER MANUFACTURING METHOD

(71) Applicant: Kabushiki Kaisha Toshiba, Minato-ku (JP)

(72) Inventors: Ikuo Uematsu, Yokohama (JP); Naoya Hayamizu, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 390 days.

(21) Appl. No.: 15/261,305

(22) Filed: Sep. 9, 2016

(65) Prior Publication Data

US 2016/0376729 A1    Dec. 29, 2016

Related U.S. Application Data

(63) Continuation of application No. PCT/JP2015/085413, filed on Dec. 17, 2015.

(30) Foreign Application Priority Data

Dec. 18, 2014  (JP) .................................. 2014-256587

(51) Int. Cl.
*D01D 5/00* (2006.01)
*B29C 48/05* (2019.01)
(Continued)

(52) U.S. Cl.
CPC ........... *D01D 5/0061* (2013.01); *B29C 48/04* (2019.02); *B29C 48/05* (2019.02); *B29C 48/142* (2019.02);
(Continued)

(58) Field of Classification Search
None
See application file for complete search history.

(56) References Cited

U.S. PATENT DOCUMENTS 6,252,129 B1    6/2001  Coffee
2001/0003148 A1    6/2001  Coffee
(Continued)

FOREIGN PATENT DOCUMENTS

CN    101198729 A    6/2008
CN    102652189 A    8/2012
(Continued)

OTHER PUBLICATIONS

International Search Report dated Mar. 15, 2016 in PCT/JP2015/085413 filed on Dec. 17, 2015 (with English translation).
(Continued)

*Primary Examiner* — Mary Lynn F Theisen
(74) *Attorney, Agent, or Firm* — Oblon, McClelland, Maier & Neustadt, L.L.P.

(57) ABSTRACT

According to the embodiment, a nanofiber manufacturing device that includes an ejector and a power generator is provided. The ejector is capable of ejecting a solution from a head portion toward a target. The power generator generates a potential difference between the head portion and the target. The head portion includes a first guide having a first surface and a second guide having a second surface, the first surface and the second surface making a gap, the gap being capable of maintaining the solution. A tip of at least one of the first guide and the second guide includes a maintain portion provided so as to be capable of maintaining the solution.

7 Claims, 5 Drawing Sheets

(51) Int. Cl.
    *B29C 48/14*           (2019.01)
    *D04H 1/728*         (2012.01)
    *B29C 48/04*           (2019.01)
    *B29C 48/30*           (2019.01)

(52) U.S. Cl.
    CPC ......... *B29C 48/147* (2019.02); *D01D 5/0069* (2013.01); *D04H 1/728* (2013.01); *B29C 48/30* (2019.02); *B29C 48/3001* (2019.02); *D01D 5/003* (2013.01)

(56) References Cited

U.S. PATENT DOCUMENTS

| | | |
|---|---|---|
| 2006/0049542 A1 | 3/2006 | Chu et al. |
| 2006/0226580 A1 | 10/2006 | Xia et al. |
| 2008/0119772 A1 | 5/2008 | Coffee |
| 2008/0237934 A1 | 10/2008 | Reneker et al. |
| 2010/0286591 A1 | 11/2010 | Coffee |
| 2012/0004370 A1 | 1/2012 | Scott et al. |
| 2012/0064186 A1 | 3/2012 | Chase et al. |
| 2012/0193836 A1* | 8/2012 | Sharma ............... D01D 5/0069 264/465 |
| 2012/0242010 A1 | 9/2012 | Ishikawa et al. |
| 2013/0034594 A1* | 2/2013 | Monzyk ............. B01D 39/1623 424/411 |
| 2013/0241115 A1* | 9/2013 | Sharma ............... D01D 5/0038 264/465 |
| 2013/0313758 A1* | 11/2013 | Sharma ................. D01D 5/34 264/465 |
| 2015/0035181 A1* | 2/2015 | Pham .................. D01D 5/0069 264/10 |
| 2015/0165667 A1 | 6/2015 | Ballard et al. |
| 2015/0211149 A1* | 7/2015 | Lamanac ................ D01D 5/18 264/8 |
| 2016/0047061 A1* | 2/2016 | Huang .................. D04H 1/732 264/468 |

FOREIGN PATENT DOCUMENTS

| | | |
|---|---|---|
| CN | 103320876 | 9/2013 |
| JP | 2000-516130 | 12/2000 |
| JP | 2000-516130 A | 12/2000 |
| JP | 2010-189782 | 9/2010 |
| JP | 2010-189782 A | 9/2010 |
| JP | 4639324 B2 | 2/2011 |
| JP | 2011-219875 | 11/2011 |
| JP | 2011-219875 A | 11/2011 |
| JP | 2017-500456 A | 1/2017 |
| WO | WO 98/03267 | 1/1998 |
| WO | WO 2011/133825 A1 | 10/2011 |

OTHER PUBLICATIONS

Written Opinion dated Mar. 15, 2016 in PCT/JP2015/085413 filed on Dec. 17, 2015.

Office Action issued in Japanese Patent Application 2014-256587 with English translation.

* cited by examiner

NANOFIBER MANUFACTURING DEVICE AND NANOFIBER MANUFACTURING METHOD

CROSS-REFERENCE TO RELATED APPLICATIONS

This is a continuation application of International Application PCT/JP2015/085413, filed on Dec. 17, 2015. This application also claims priority to Japanese Application No. 2014-256587, filed on Dec. 18, 2014. The entire contents of each are incorporated herein by reference.

FIELD

Embodiments described herein relate generally to a nanofiber manufacturing device and a nanofiber manufacturing method.

BACKGROUND

Nanofiber manufacturing devices have been used in a wide range of fields such as in medicine for production of fiber materials having nano-scale diameters. Electrospinning is in wide use in such nanofiber manufacturing devices.

Electrospinning is a technique that electrically charges a solution of, for example, a polymeric substance, and a work, and ejects the solution toward the work by using the potential difference between the solution and the work. A nanofiber is manufactured as the solution becomes electrically stretched. In such a nanofiber manufacturing device, it is desirable to shorten manufacturing time, and improve productivity.

DETAILED DESCRIPTION

An embodiment of the invention provides a nanofiber manufacturing device that includes an ejector and a power generator. The ejector is capable of ejecting a solution from a head portion toward a target. The power generator generates a potential difference between the head portion and the target. The head portion includes a first guide having a first surface and a second guide having a second surface, the first surface and the second surface making a gap, the gap being capable of maintaining the solution. A tip of at least one of the first guide and the second guide includes a maintain portion provided so as to be capable of maintaining the solution.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

Embodiment

Figure 1:
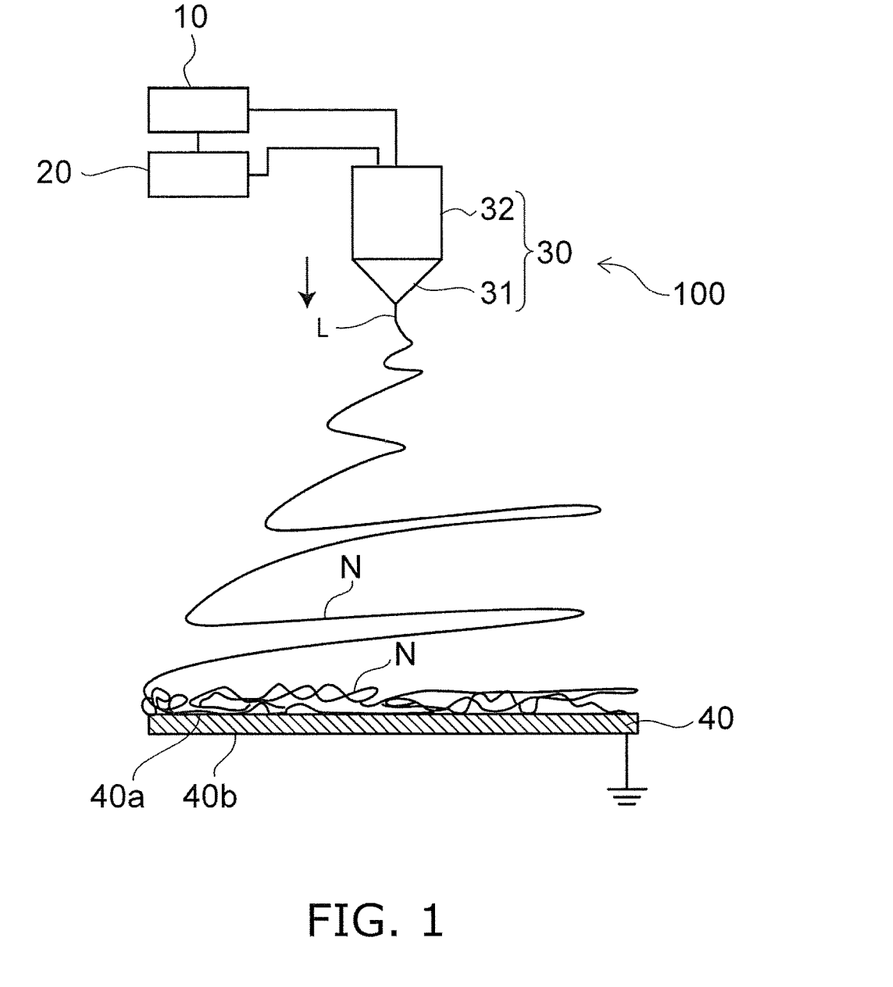
FIG. 1 is a schematic view illustrating a nanofiber manufacturing device according to an embodiment.

FIG. 1 is a schematic view illustrating a nanofiber manufacturing device according to an embodiment.

As shown in FIG. 1, a nanofiber manufacturing device 100 includes a power generator 10, a controller 20, and an ejector 30. The arrow in FIG. 1 indicates the direction of ejection of solution from the ejector 30.

In the nanofiber manufacturing device 100, the ejector 30 ejects a solution dissolving a polymeric substance or the like, and an ejected liquid L is electrically stretched in space to form a nanofiber N on a target 40. The nanofiber N deposited on the target 40 by the nanofiber manufacturing device 100 of the embodiment is a fiber with a smooth surface or a porous surface, or a fiber having a bead shape, a core-in-sheath shape, or a hollow shape, or an ultrafine fiber, for example. For example, the nanofiber manufacturing device 100 of the embodiment form a separator for batteries.

The power generator 10 is a power supply unit that applies a high voltage between the ejector 30 and the target 40. The power generator 10 is a power supply unit using a DC power supply. For example, one of the terminals of the power generator 10 is electrically connected to the ejector 30, and the other terminal is grounded. One terminal of the target 40 is grounded. With such interconnections, a potential difference can be generated between the ejector 30 and the target 40.

The controller 20 controls the operation of the power generator 10 and the ejector 30. The controller 20 is electrically connected to the power generator 10 and the ejector 30. For example, the controller 20 controls the power generator 10 to determine the voltage value applied to the ejected liquid L. The controller 20 controls the ejector 30 to determine the amount of ejected liquid L. The controller 20 is, for example, a computer with various components, including a CPU (Central Processing Unit), and memory.

The ejector 30 is, for example, a nozzle through which the solution, a nanofiber N-forming material, is ejected. The ejector 30 has a head portion 31, and a main body portion 32. The solution is ejected through the head portion 31. The head portion 31 is detachably connected to the main body portion 32.

For example, the solution is stored in a tank separately provided from the ejector 30, and supplied from the tank to the ejector 30 via a pipe. In other words, the nanofiber manufacturing device 100 may include a supply unit for supplying the solution to the ejector 30. More than one ejector may be provided. A plurality of ejectors 30 may be arranged in a straight line in any direction.

The solution is a liquid in which a base material solute of nanofiber N is dispersed or dissolved in a solvent, and is appropriately adjusted according to conditions such as the material or the properties of the nanofiber N. For example, the solute dispersed or dissolved in the solution may be a resin. The solvent used for the solution may be an organic solvent having volatility. Inorganic solid materials may be added to the solution.

The nanofiber N produced in the space between the ejector 30 and the target 40 is deposited on the target 40, and collected. For example, the target 40 is a substrate. The target 40 may be a sheet-like member. When the target 40 is a sheet-like member, the nanofiber may be collected after it has deposited on, for example, a roll of the target 40.

The target 40 may be movable. For example, the target 40 may be a rotary drum, or a belt conveyer. The belt conveyer is suitable for mass production of nanofiber N because it allows for use of a long belt.

The target 40 has a first surface 40a and a second surface 40b. The first surface 40a is a surface opposite the second surface 40b. The nanofiber N is deposited on the first surface 40a of the target 40. An electrode may be provided on the second surface 40b of the target 40. A potential difference is generated between the ejected liquid L that is under the voltage applied by the power generator 10, and the electrode provided on the second surface 40b, and the ejected liquid L is guided toward the electrode. The nanofiber N deposits on the first surface 40a of the target 40. The target 40 may be an electrode. In this case, the nanofiber N deposits on the electrode.

The following describes the case where the ejector 30 is a nozzle. The head portion 31 is a nozzle head, and the main body portion 32 is a nozzle main body.

Figure 2:
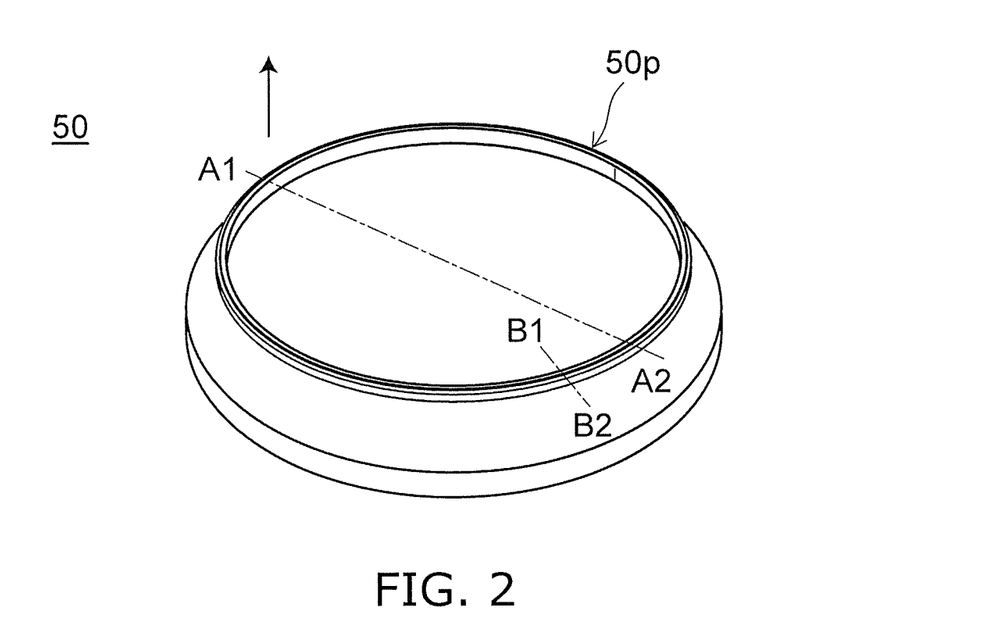
FIG. 2 is a schematic view showing a nozzle head according to the embodiment.

FIG. 2 is a schematic view showing a nozzle head according to the embodiment.

Figure 3:
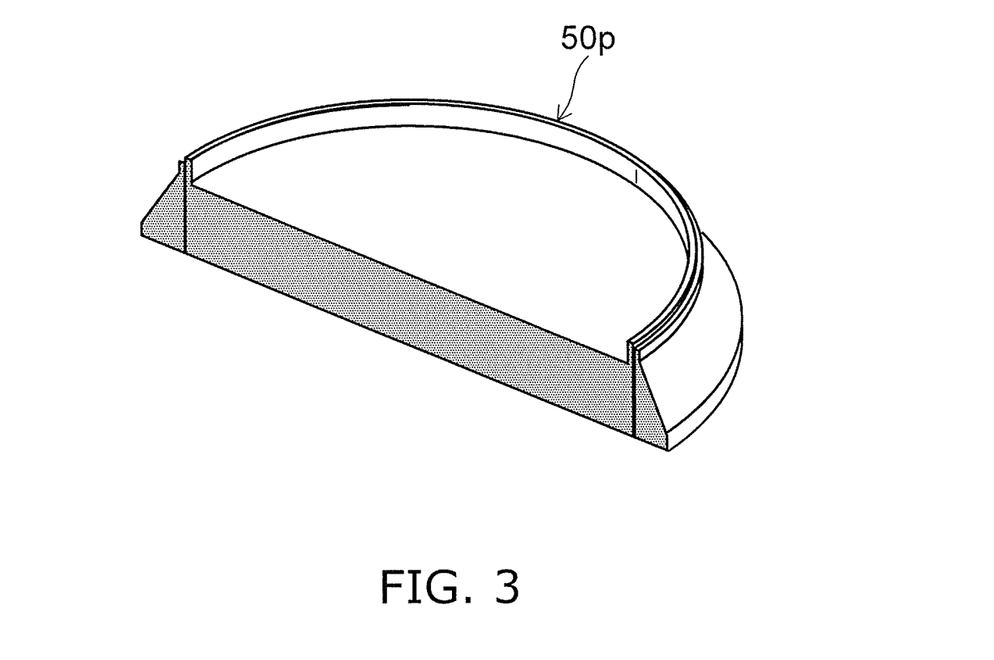
FIG. 3 is a cross sectional view of the nozzle head according to the embodiment.

FIG. 3 is a cross sectional view of the nozzle head according to the embodiment.

Figure 4:
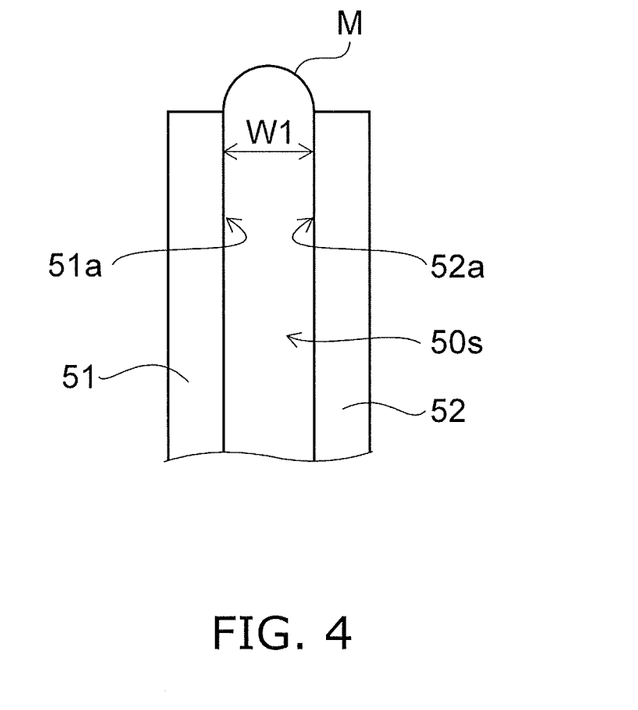
FIG. 4 is a cross sectional view of an enlarged portion of the nozzle head according to the embodiment.

FIG. 4 is a cross sectional view of an enlarged portion of the nozzle head according to the embodiment.

The direction of arrow in FIG. 2 corresponds to the direction of arrow of FIG. 1. FIG. 3 is a cross sectional view taken at line A1-A2 of FIG. 2. FIG. 4 is a view of an enlarged cross section taken at line B1-B2 of FIG. 2.

As shown in FIGS. 2 and 3, a nozzle head 50 has a tip portion 50p for ejecting the solution. For example, the tip portion 50p has a substantially circular shape when projected on a plane perpendicular to a direction from the nozzle main body to the nozzle head 50 (the direction of arrow in FIG. 2). The tip portion 50p may be substantially elliptical in shape.

The tip portion 50p may partly have a substantially arc shape when projected on a plane perpendicular to the direction from the nozzle main body to the nozzle head 50. For example, the tip portion 50p may have a shape with a substantially arc portion and a substantially straight portion.

The nozzle head 50 uses, for example, metallic materials such as iron, aluminum, and stainless steel. The nozzle head 50 may use, for example, resin materials. The durability of the nozzle head 50 can improve when metallic materials are used for the nozzle head 50.

For example, the nozzle head 50 may be formed with a main body, a covering covering the outer wall surface of the main body, and a support supporting the main body and the covering. In this case, the nozzle head 50 is connected to the nozzle main body via the support.

The nozzle head 50 has an internal aperture (not illustrated). By providing an aperture inside the nozzle head 50, it is possible to store the solution supplied from the supply unit or the like through the nozzle main body. For example, the aperture may have a substantially circular ring shape when projected on a plane perpendicular to the direction from the nozzle main body to the nozzle head 50.

As shown in FIG. 4, the nozzle head 50 has a first guide 51 and a second guide 52 at the tip portion 50p. At the tip portion 50p, a gap portion 50s is provided between an outer wall surface 51a of the first guide 51, and an inner wall surface 52a of the second guide 52. Specifically, a slit is provided at the tip portion 50p of the nozzle head 50.

The gap portion 50s is a portion that is in communication with the internal aperture via a channel, and where a solution M dissolving a polymeric substance or the like is maintained. The outer wall surface 51a of the first guide 51 represents a first surface, and the inner wall surface 52a of the second guide 52 represents a second surface. The main body and the covering of the nozzle head 50 may have the first guide 51 and the second guide 52, respectively. In this case, the outer wall surface of the main body represents a first surface, and the inner wall surface of the covering represents a second surface.

The gap portion 50s has a substantially circular ring shape when projected on a plane perpendicular to the direction from the nozzle main body to the nozzle head 50. Specifically, the gap portion 50s has a substantially circular ring shape when projected on a plane parallel to the direction from the first guide 51 to the second guide 52. The gap portion 50s may be substantially elliptical in shape. For example, the gap portion 50s has a width W1 of 0.1 mm or more and 5.0 mm or less.

The gap portion 50s may partly have a substantially arc shape when projected on a plane perpendicular to the direction from the nozzle main body to the nozzle head 50. Specifically, the gap portion 50s may partly have a substantially arc shape when projected on a plane parallel to the direction from the first guide 51 to the second guide 52. For example, the gap portion 50s may have a shape with a substantially semicircular portion and a substantially rectangular portion.

In the nanofiber manufacturing device 100 of the embodiment, the solution M stays at the tip of the gap portion 50s of the nozzle head 50 under surface tension when there is no applied voltage from the power generator 10. In response to a voltage applied between the nozzle head 50 and the target 40, the solution M at the tip of the gap portion 50s becomes positively (or negatively) charged, and is drawn by the electrostatic force acting along the line of electric force directed toward the target 40 of the opposite charge (earthed). The voltage applied between the nozzle head 50 and the target 40 is approximately 10 to 100 kV.

The solution M is ejected out of the gap portion 50s of the nozzle head 50 upon the electrostatic force exceeding the surface tension. The ejected liquid L through the gap portion 50s is continuously expelled from the gap portion 50s toward the target 40 in the shape of the gap portion 50s (for example, a substantially circular ring shape). Here, the solvent contained in the ejected liquid L vaporizes, and the polymer fiber body reaches the target 40. The fiber body is continuously formed in the shape of the gap portion 50s, and forms a coiled spiral trajectory with respect to the direction from the gap portion 50s to the target 40. As a result, the nanofiber N deposits on the target 40. The nanofiber manufacturing device 100 of the embodiment forms the nanofiber N by electrospinning.

Figure 5A:
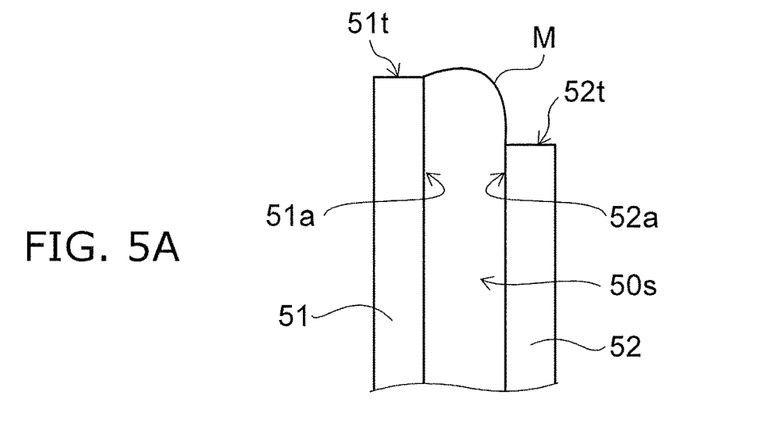
FIGS. 5A to 5C are cross sectional views showing an enlarged portion of another nozzle head according to the embodiment.
Figure 5B:
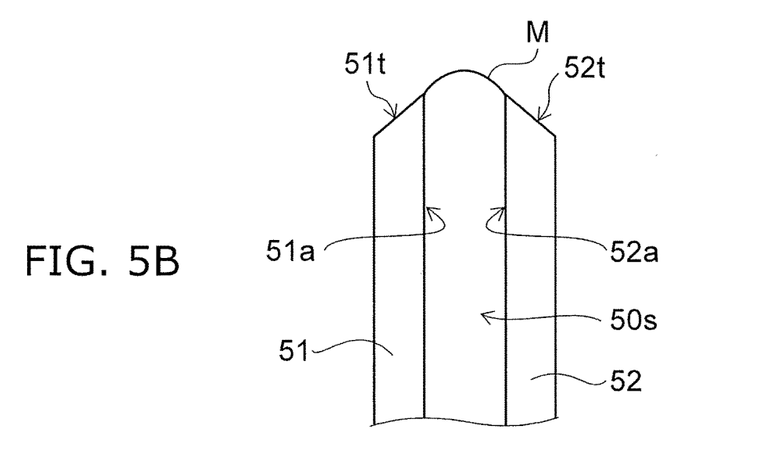
Figure 5C:
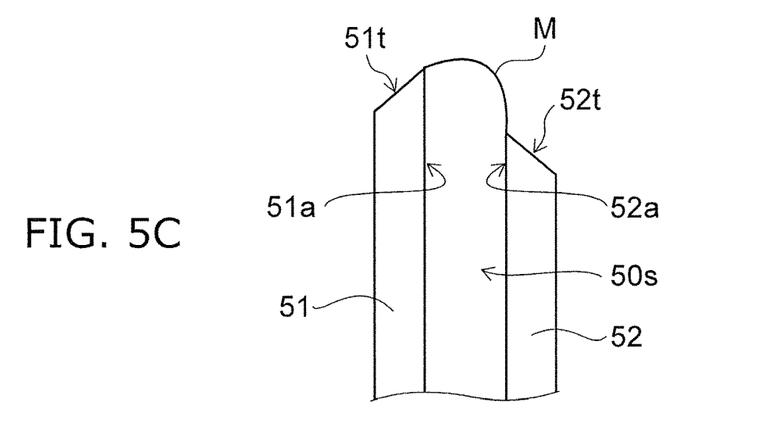

FIGS. 5A to 5C are cross sectional views showing an enlarged portion of another nozzle head according to the embodiment.

FIGS. 5A to 5C show the gap portion 50s provided between the outer wall surface 51a of the first guide 51 and the inner wall surface 52a of the second guide 52 at the tip portion 50p of the nozzle head 50.

As shown in FIG. 5A, a step is provided between an end portion 51t of the first guide 51 and an end portion 52t of the second guide 52. Specifically, the gap portion 50s is partly sloped. The solution M is maintained in the gap portion 50s.

The solution M is ejected from the gap portion 50s by the following mechanism. Applying a high voltage between the nozzle and the target 40 causes ions of the same charged polarity as the polarity of the applied voltage to the nozzle to accumulate on the surface of the solution M at the tip portion 50p of the nozzle head 50. By the interaction between the surface charge of the solution M and the electric field created by the applied voltage between the nozzle and the target 40, the solution M erupts in a semispherical shape at the tip portion 50p of the nozzle head 50. This shape of the solution M is known as the Taylor cone.

The ejected liquid L ejected from the gap portion 50s as a result of forming the Taylor cone is continuously expelled from the gap portion 50s toward the target 40 in the shape of the gap portion 50s. The Taylor cone more easily forms when a potential gradient is created in the vicinity of the tip portion 50p of the nozzle head 50.

As shown in FIG. 5A, it becomes easier to create a potential gradient in the vicinity of the end portion 51t and the end portion 52t when a step is provided between the end portion 51t and the end portion 52t. This makes it easier to form the Taylor cone at the tip portion 50p of the nozzle head 50. In this way, it becomes easier to continuously expel the ejected liquid L from the gap portion 50s toward the target 40 in the shape of the gap portion 50s.

As shown in FIG. 5B, the end portion 51t of the first guide 51 is sloped. The end portion 51t is downwardly sloped toward the inner side of the nozzle head 50. The end portion 52t of the second guide 52 is sloped. The end portion 52t is downwardly sloped toward the outer side of the nozzle head 50. The solution M is maintained in the gap portion 50s.

It becomes easier to maintain the solution M in the gap portion 50s when a slope is provided on the end portion 51t and the end portion 52t, as shown in FIG. 5B. This also makes it easier to eject the solution M from the gap portion 50s, and adhesion of the solution M to the end portion 51t and the end portion 52t can be inhibited. It is also possible to reduce clogging of the gap portion 50s with the solution M.

As shown in FIG. 5C, a step may be provided between the end portion 511 and the end portion 52t, and the end portion 51t and the end portion 52t may be sloped. By providing the end portion 51t and the end portion 52t as shown in FIG. 5C, it becomes easier to continuously expel the ejected liquid L from the gap portion 50s toward the target 40 in the shape of the gap portion 50s. This also makes it easier to maintain the solution M in the gap portion 50s. Because the solution M is easily ejected from the gap portion 50s, adhesion of the solution M to the end portion 51t and the end portion 52t can be inhibited. It is also possible to reduce clogging of the gap portion 50s with the solution M.

Figure 6:
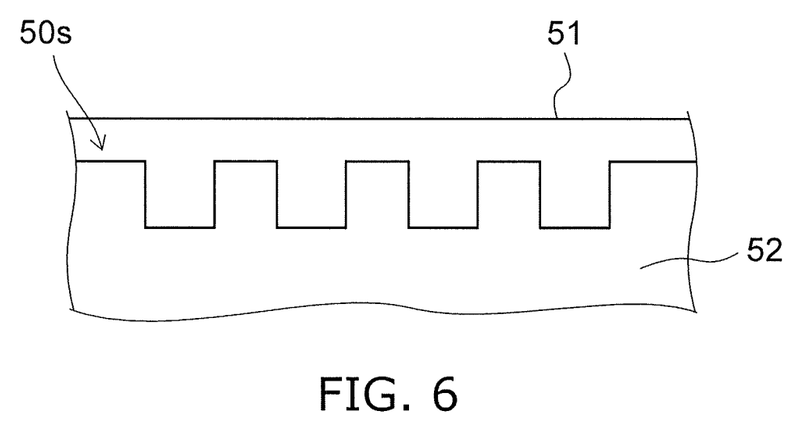
FIG. 6 is an enlarged view of a portion of the nozzle head according to the embodiment.

FIG. 6 is an enlarged view of a portion of the nozzle head according to the embodiment.

FIG. 6 is a vertically enlarged view of the tip portion 50p of the nozzle head 50 with respect to line B1-B2 of FIG. 2.

As shown in FIG. 6, the tip portion 50p has concave and convex on the second guide 52. Providing the concave and convex on the second guide 52 makes it easier to maintain the solution M in the gap portion 50s. The concave and convex may be provided on the first guide 51. Specifically, the concave and convex may be provided on at least one of the first guide 51 and the second guide 52 at the tip portion 50p of the nozzle head 50.

In a nanofiber manufacturing device using electrospinning, there are cases where a needle nozzle, or a nozzle having a nozzle head with a plurality of holes arranged in a straight line is used as the nozzle that ejects the voltage-applied ejected liquid. However, when such nozzles are used, the ejected liquid through the nozzle tends to spread outwardly from the nozzle because of the nozzle structure. The electric field also makes the ejected liquid more easily spread outwardly from the nozzle. This makes it difficult for the nanofiber formed by the ejected liquid from the nozzle to evenly deposit on the target.

On the other hand, in the nanofiber manufacturing device 100 of the embodiment, the gap portion 50s having a substantially circular ring shape is provided at the tip of the nozzle head 50. The gap portion 50s can increase the number of times the nanofiber N is generated. It also becomes easier to evenly deposit the nanofiber N on the target 40.

The embodiment provides a nanofiber manufacturing device having reduced manufacturing time, and improved mass productivity.

Figure 7:
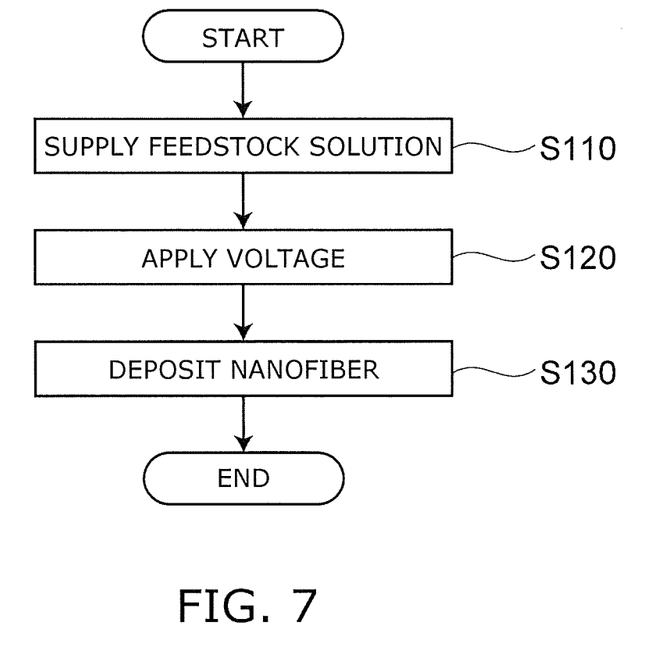
FIG. 7 is a flowchart representing a nanofiber manufacturing method according to the embodiment.

FIG. 7 is a flowchart representing a nanofiber manufacturing method according to the embodiment.

The following describes a method of production of nanofiber N with the nanofiber manufacturing device 100.

The solution M is supplied to the ejector 30 (step S110). The ejector 30 is a nozzle. The solution M is stored in the nozzle.

The power generator 10 applies a voltage between the ejector 30 and the target 40 (step S120). The solution M is ejected out of the gap portion 50s of the nozzle head 50 upon the electrostatic force exceeding the surface tension as a result of the high voltage application. The ejected liquid L from the gap portion 50s is continuously expelled from the gap portion 50s toward the target 40 in the shape of the gap portion 50s. The gap portion 50s has, for example, a substantially circular ring shape. The gap portion 50s may be substantially elliptical in shape. The gap portion 50s may partly have a substantially arc shape.

The nanofiber N produced between the ejector 30 and the target 40 is deposited on the target 40 (step S130).

The embodiment provides a nanofiber manufacturing method having reduced manufacturing time, and improved mass productivity.

Hereinabove, embodiments of the invention are described with reference to specific examples. However, the invention is not limited to these specific examples. For example, one skilled in the art may similarly practice the invention by appropriately selecting specific configurations of components such as the power generator, the controller, the ejector, the target, the nozzle head, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A nanofiber manufacturing device comprising:
   an ejector that is capable of ejecting a solution from a head portion toward a target; and
   a power generator that generates a potential difference between the head portion and the target, wherein
   the head portion includes a first guide having a first surface and a second guide having a second surface, the first surface and the second surface making a gap, the gap being capable of maintaining the solution,
   a tip of at least one of the first guide and the second guide includes a maintain portion provided so as to be capable of maintaining the solution,
   the tip of at least one of the first guide and the second guide has a concave and a convex, and
   a step is provided between an end portion of the first guide and an end portion of the second guide.

2. The device according to claim 1, wherein the gap has a substantially circular ring shape when projected on a plane parallel to a direction from the first guide to the second guide.

3. The device according to claim 1, wherein the gap partly has a substantially arc shape when projected on a plane parallel to a direction from the first guide to the second guide.

4. The device according to claim 1, wherein the first guide has a sloped end portion, and the second guide has a sloped end portion.

5. The device according to claim 4, wherein
   the sloped end portion of the first guide is downwardly sloped toward an inner side of the head portion, and
   the sloped end portion of the second guide is downwardly sloped toward an outer side of the head portion.

6. The device according to claim 1, wherein the gap has a width of 0.1 mm or more and 5.0 mm or less.

7. A nanofiber manufacturing method using the nanofiber manufacturing device of claim 1,
   the method comprising:
   supplying the solution to the ejector;
   applying a voltage between the ejector and the target; and
   depositing a nanofiber on the target.

* * * * *